United States Patent [19]

Saitoh et al.

[11] Patent Number: 5,635,005
[45] Date of Patent: Jun. 3, 1997

[54] METHOD OF RECYCLING SUPPORT MATERIAL FOR IMAGE-BEARING SUPPORT

[75] Inventors: Tadashi Saitoh; Kiyoshi Tanikawa, both of Yokohama; Eiichi Kawamura, Numazu, all of Japan

[73] Assignee: Ricoh Company, Ltd., Tokyo, Japan

[21] Appl. No.: 453,751

[22] Filed: May 30, 1995

Related U.S. Application Data

[63] Continuation of Ser. No. 202,229, Feb. 25, 1994.

[30] Foreign Application Priority Data

Feb. 26, 1993 [JP] Japan .................... 5-063285

[51] Int. Cl.$^6$ .................... B44C 1/165
[52] U.S. Cl. .................... 156/234; 156/230; 156/281
[58] Field of Search .................... 156/73.1, 230, 156/235, 236, 238, 239, 240, 281, 234

[56] References Cited

U.S. PATENT DOCUMENTS

| | | | |
|---|---|---|---|
| 2,721,821 | 10/1955 | Hoover | 154/95 X |
| 3,376,182 | 4/1968 | Borell | 156/235 |
| 3,613,701 | 10/1971 | Ando | 134/64 |
| 3,924,026 | 12/1975 | Penfield | 156/281 X |
| 4,111,734 | 9/1978 | Rosenfeld | 156/234 X |
| 4,786,195 | 11/1988 | Hibino | 400/696 |
| 5,006,189 | 4/1991 | Tsukamoto et al. | 156/247 |
| 5,057,182 | 10/1991 | Wuchinich | 156/580.1 |
| 5,198,060 | 3/1993 | Kurtin | 156/230 X |
| 5,238,538 | 8/1993 | Jagannoah | 162/50 X |
| 5,282,919 | 2/1994 | Brooks | 156/379.6 |

FOREIGN PATENT DOCUMENTS

| | | | |
|---|---|---|---|
| 2937668 | 8/1980 | Germany . | |
| 6420191 | 1/1989 | Japan | 156/235 |
| 101576 | 4/1989 | Japan . | |
| 101577 | 4/1989 | Japan . | |
| 297294 | 11/1989 | Japan . | |
| 64472 | 2/1992 | Japan . | |

*Primary Examiner*—James Sells
*Attorney, Agent, or Firm*—Oblon, Spivak, McClelland, Maier & Neustadt, P.C.

[57] ABSTRACT

A method for recycling a support material of an image-bearing support is composed of the steps of (a) impregnating an image-bearing support, at least part of which is composed of a paper layer, and on which paper layer images made from a thermofusible ink containing a thermofusible resin component are formed, with at least one of water or an aqueous solution which is selected from the group consisting of an aqueous solution containing a surfactant, an aqueous solution containing a water-soluble polymer, and an aqueous solution containing a water-soluble polymer and a surfactant; (b) causing an image release member to adhere to the image bearing side of the support with the application of heat thereto, the image release member including a resin layer which is composed of the same thermofusible resin component as that contained in the thermofusible ink, or a resin layer having the same or substantially the same SP value as that of the thermofusible resin component in said thermofusible ink; and (c) peeling the images away from the support, under the conditions that the thermofusible ink is fused, by removing the image release member from the support.

4 Claims, No Drawings

METHOD OF RECYCLING SUPPORT MATERIAL FOR IMAGE-BEARING SUPPORT

This application is a Continuation of application Ser. No. 08/202,229, filed on Feb. 25, 1994, now abandoned.

BACKGROUND OF THE INVENTION

1. Field of the Invention

The present invention relates to a method for recycling a support material from an image bearing support which bears images thereon comprising a thermofusible ink, more particularly to a method for copy paper from an image bearing copy paper.

2. Discussion of Background

Because of recent rapid development of office automation, a large quantity of papers for printers and copying machines has been used and consumed. This has caused the problems of the environmental disruption of the earth due to deforestation.

Conventionally, in order to recycle papers of this kind, printed ink is removed from the paper, and the ink-removed paper is crushed and paper is made therefrom again. This has been an only method of recycling this kind of paper materials.

However, recently a method of recycling used copy papers by cleaning printed images off the surface of the copy paper has been developed, and examples of such a recycling method have been described, for instance, in the following references:

(1) Japanese Laid-Open Patent Application 4-64472:

A releasing agent such as a silicone sealing agent is applied to the surface of a new copy paper and dried to prepare a copy paper that can be recycled. Images are formed on the releasing agent applied surface of the copy paper.

The image-bearing-surface of the thus prepared copy paper is brought into contact with a thermofusible resin which is one of image formation components of the toner (hereinafter referred to as toner resin), and is caused to adhere to the thermofusible resin to remove toner images from the copy paper.

This method, however, has the following shortcomings:

(a) Since a releasing agent is applied to a copy paper, the image fixing performance thereof is poor as a matter of course.

(b) The thermofusible resin is caused to adhere to the toner resin, which is one of image formation components, under the application of heat thereto, and toner images are mechanically peeled away from the surface of the copy paper. However, it is impossible to completely remove the toner resin since the toner resin penetrates into the fibers of the copy paper and firmly fixed thereto. Therefore, the recycling performance of this copy paper is extremely poor.

(c) In view of the significance of recycling resources, duplex copies which bear images on both sides thereof are useful and will become very popular in the future. Under such circumstances, the method of producing copy papers for recycling by applying a releasing agent to one side of a copy paper is neither effective nor useful.

(d) Even if the releasing agent is applied to both sides of the copy paper, as long as the releasing agent is a silicone sealing agent, it will penetrate into the copy paper and the copy paper will become semitransparent. If this takes place, that copy paper cannot be used as duplex copy paper.

(e) When this erasable copy paper is mixed with plain copy paper, its distinction is not easy when used in practice, and its separation is not a practical operation for the efficiency of office work.

(2) Japanese Laid-Open Patent Applications 1-101576 and 1-101577.

A toner-image-bearing copy paper is immersed into an organic solvent in which the toner resin contained in the toner images of the toner-image-bearing copy paper is soluble, and is then subjected to an ultrasonic wave treatment, thereby removing toner images from the copy paper. This method, however, has the shortcoming that organic solvents used cause air pollution problems and are ignitable and toxic, accordingly not suitable for office or home use.

(3) Japanese Laid-Open Patent Application 1-297294

In this application, metal, paper into which liquids hardly penetrate, and ceramics are employed as the support of a toner-image-bearing member, plastics, and toner images formed on the support are heated through a thermofusible releasing member, whereby toner images are peeled off the support and the support is cleaned. In this method, however, a special erasable paper subjected to releasing treatment has to be used. Therefore, this method has the shortcoming that it cannot be applied to a large quantity of copy paper and printing paper now in general use.

Furthermore, the applicants of the present invention have proposed a method of using an ink-image-bearing support at least part of which is composed of paper, and causing an image releasing member to adhere to the support with the application of heat or pressure thereto, with water or an aqueous solution being contained therein, thereby peeling the toner images off the support and recycling the support. In this method, however, when the ink is not thermally fused, the ink is firmly deposited on the fiber of the support, so that when the ink images are peeled off the support, the surface of the support is considerably impaired.

The basic systems of electrostatic copying machines can be classified into three systems, that is, electrofax, xerography, and NP.

SUMMARY OF THE INVENTION

It is therefore an object of this invention to provide a method of recycling recycled paper, and copy paper and printing paper that can be recycled, which is employed not only for cleaning the previously mentioned special erasable paper, and printing paper, but also for removing PPC copied images and PPC printing images from such image bearing papers.

The object of this invention can be achieved by a recycling method comprising the steps (a) impregnating an image-bearing support, at least part of which is composed of a paper layer, and on which paper layer images made from a thermofusible ink containing a thermofusible resin component are formed, with at least one of water or an aqueous solution which is selected from the group consisting of an aqueous solution containing a surfactant, an aqueous solution containing a water-soluble polymer, and an aqueous solution containing a water-soluble polymer and a surfactant; (b) causing an image release member to adhere to the image bearing side of the support with the application of heat thereto, the image release member including a resin layer which is composed of the same thermofusible resin component as that contained in the thermofusible ink, or a resin layer having the same or substantially the same SP value (solubility parameter value) as that of the thermofusible resin component in said thermofusible ink; and (c) peeling the images away from the support, under the conditions that the thermofusible ink is fused, by removing the image release member from the support.

The electrofax system requires photosensitive paper for copying, while the xerography system is capable of using plain paper. Therefore, the xerography system is mainly used at present. In particular, plain paper copiers (PPC) based on the xerography system have the advantages over other systems that there is no limitation on the selection of copy paper, and the running cost of plain paper to be used is cheap, and the increasing of copy speed is easy.

As the material for the support for use in the present invention, copy paper and printing paper are mainly used, but the material for the support is not limited to such materials, but any materials which can bear images thereon can be employed.

Furthermore, it is not always necessary that the support consist of paper in its entirety, but the support with a paper layer which can bear images made of a thermofusible ink can be employed. For instance, a composite material composed of a paper layer and a plastics layer which are overlaid can be employed.

DESCRIPTION OF THE PREFERRED EMBODIMENTS

A key feature of the present invention is that images composed of a thermofusible ink comprising a thermofusible resin formed on a support are removed from the support by use of an image release member comprising a resin layer which comprises the same thermofusible resin as that contained in the thermofusible ink or a resin layer which has the same or substantially the same SP value as that of the thermofusible resin, by subjecting the same to ultrasonic wave treatment, under the conditions that image-bearing support is made wet with an aqueous solution, whereby the support is recycled and reused as it is.

Generally when paper is made wet, its stiffness is decreased. In the case of a copy paper with images composed of a hydrophobic thermofusible ink, when the copy paper is made wet, the adhesion between the hydrophobic ink held in the paper and the paper is extremely decreased.

For wetting a support paper which bears images made of a thermofusible ink with water in a short timer the water-wettability of a support paper is an important factor. Furthermore, for removing the ink images from the support paper, it is required that a sufficient amount of water permeate into the interface between the thermofusible ink and the support paper.

Furthermore, in order to make easy the releasing of the thermofusible ink from the support paper, an aqueous solution of a water-soluble polymer is also useful.

Representative examples of such a water-soluble polymer are shown in the following Table 1. Water-soluble polymers for use in the present invention are not limited to those shown in Table 1.

TABLE 1

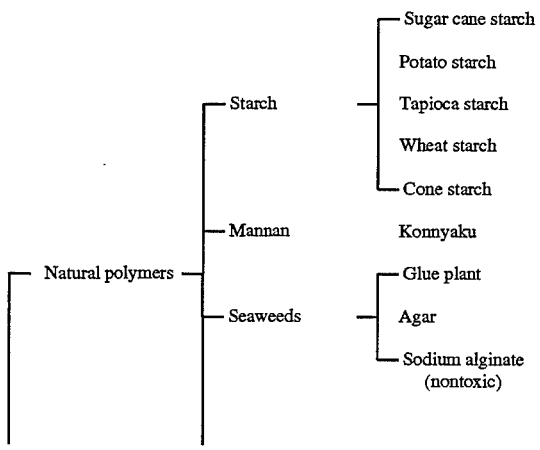

TABLE 1-continued

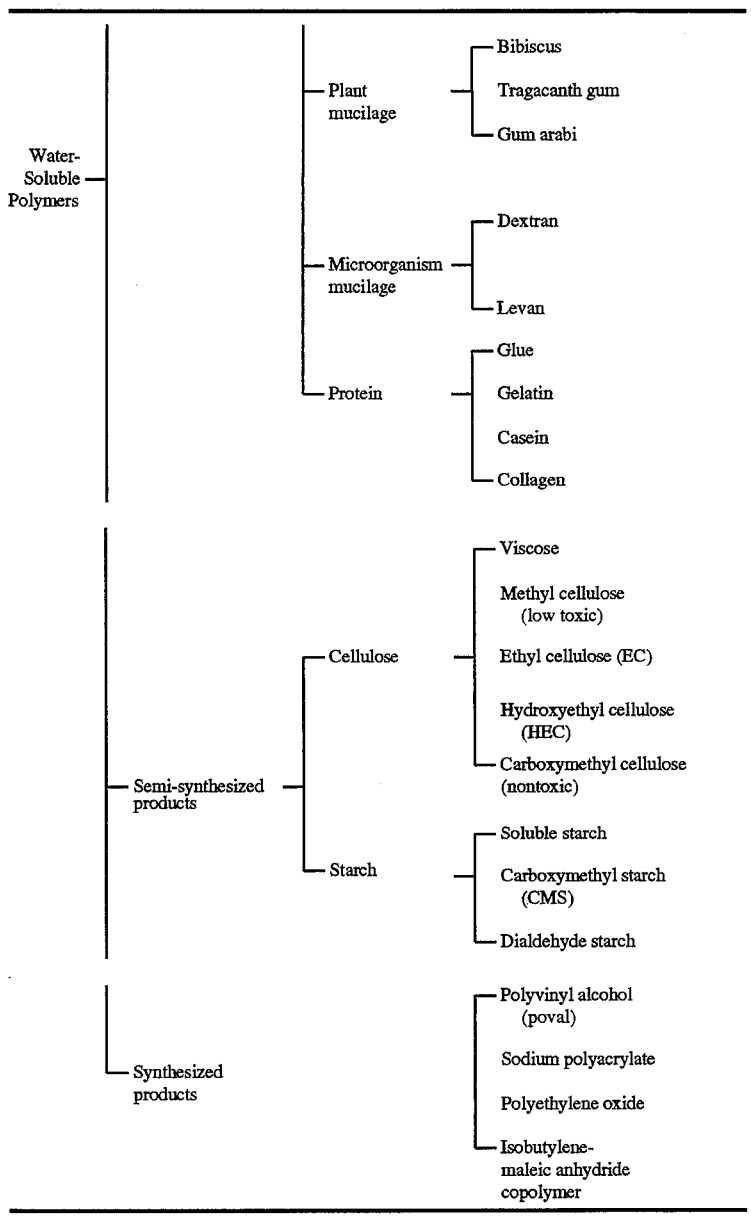

In order to cause water and aqueous solutions of these polymers to permeate into the image-bearing support effectively, it is preferable to contain a surfactant.

Specific examples of such a surfactant include anionic surfactants of a fatty acid derivative type, a sulfuric ester type, a sulfonic acid type, and a phosphoric ester type; cationic surfactants such as quaternary ammonium salts, amines having an ester bonding, quaternary ammonium salts having an ether bond, heterocyclic amines, and amine derivatives; ampholytic surfactants; and nonionic surfactants.

These surfactants and water-soluble polymers are used as sizing agents for paper in paper-manufacturing industry. Therefore even if these surfactants and water-soluble polymers are employed, they do not impair the surface of paper, but improve the quality of the surface of paper.

The concentration of such a surfactant or water-soluble polymer in the aqueous solution is preferably in the range of 0.1 to 20 wt. %, more preferably in the range of 0.5 to 10 wt. %. When the concentration of the surfactant or water-soluble polymer is excessively high, the recycled paper tends to become hard or adhesive because of the absorption of water in air.

The above-mentioned water, aqueous solution of a water-soluble polymer, and the surfactant-containing water or aqueous solution mentioned above are caused to permeate into the image bearing support speedily and sufficiently when the permeation is conducted under the application of ultrasonic waves thereto, and accordingly the removal of images from the image-bearing support can be conducted effectively.

In the present invention, the term "image release member" means a member comprising a support and a resin component which is provided on the surface of the support and becomes adhesive to the images on the image-bearing support when the images are fused with the application of heat thereto.

Examples of such a resin component include (1) the same resin as that contained in toner or thermofusible ink and (2) a resin having the same or substantially the same SP value as that of a resin contained in toner or thermofusible ink.

When such a resin is used, the SP value of images which is attributable to the cohesive energy density thereof is the same or substantially the same as the SP value of the image releasing member, so that the surface tensions of the images and the image releasing member are small and accordingly the adhesion strength between the two is high and therefore the image releasing can be conducted efficiently.

From a theoretical aspect of adhesive agents or adhesiveness, when the surface tension of an adhesive agent and that of a material to which the adhesive agent is applied are equal and the two have substantially the same polarity, the interface tension becomes minimal and the adhesion strength becomes maximum. Therefore in particular when the previously mentioned resins (1) and (2) have polarity groups of the same kind, the interface tension becomes minimal and the adhesion strength is improved.

It is preferable that the resin (2) have an SP value in the following range:

SP value=8.0 to 12.0 $(cal/cm^3)^{1/2}$

Representative examples of a resin having en SP value in the above-mentioned range are shown in the following Tables 2 and 3:

TABLE 2

[Acrylic resin]

Acrylic resin solution type:

Acryloid B-44 (Trademark)
Acryloid B-66 (Trademark)
Acryloid B-72 (Trademark)
Acryloid B-82 (Trademark)
Polyisobutylmethacrylate
Polyethylmethacrylate
Polybutylacrylate
Polybutylmethacrylate
Polymethacrylic acid
Polymethylmethacrylate
[Alkyd resin]

30% soybean oil fatty acid — glycerol phthalate
45% soybean oil fatty acid — glycerol phthalate
45% soybean oil fatty acid — pentaerythritol phthalate
45% linseed oil — glycerol phthalate
[Amino resin]

Urea-formaldehyde resin:

Beckamine P-196 (Trademark)
Butylated urea-formaldehyde resin:

Beetle 227-8 (Trademark)
Butylated melamine formaldehyde resin:

Resimene 888 (Trademark)
Benzoguanamine — formaldehyde resin:

UformiteMX-61 (Trademark)
[Epoxy resin]

Bisphenol — epichlorohydrin condensation product:

Epon E-72 (Trademark)
Epon 812 (Trademark)
Epon 864 (Trademark)
Epon 1001 (Trademark)
Epon 1004 (Trademark)
Epon 1007 (Trademark)
Epon 1009 (Trademark)

TABLE 2-continued

[Hydrocarbon based resin]

Cyclized rubber:

Alpex cyclized rubber (Trademark)
Hydrocarbon resin:

Gilsonite Brilliant Black (Trademark)
Gilsonite Selects (Trademark)
Nebony 100 (Trademark)
Nevillie LX 685 (Trademark)
Panarez 3-210 (Trademark)
Petrolatum 125 HMP (Trademark)
Natural rubber:

Pliolite NR (Trademark)
Pliolite P-1230 (Trademark)
[Vinyl resin]

Ethylene — vinylacetate copolymer:

Elvax 150 (Trademark)
Elvax 250 (Trademark)
Elvax EOD 3602-1 (Trademark)
Vinylidene chloride — acrylonitrile copolymer:

Saran F-120 (Trademark)
Saran F-220 (Trademark)
Vinyl chloride — vinylacetate copolymer:

Vinylite VYHH (Trademark)
Partial hydrolyzed vinyl chloride — vinylacetate copolymer:

Vinylite VAGH (Trademark)
Vinyl chloride — vinylacetate — maleic anhydride terpolymer:

Vinylite VMCH (Trademark)
Polyvinyl chloride:

Exon 470 (Trademark)
Exon 471 (Trademark)
Exon 473 (Trademark)
Polyvinyl isobutyl ether
Polyvinyl ethyl ether;
Polyvinylbutyral:

Vinylite XYHL, XYSG (Trademark)
Polyvinyl butyl ether;
Polyvinylformal:

Formvar 7/70E (Trademark)
Formvar 15/95E (Trademark)
[Phenol resin]

Terpenephenol resin:

Durez 220 (Trademark)
Phenol resin:

Bakelite CKR-5360 (Trademark)
Bakelite CKR-2400 (Trademark)
Bakelite BKR-2620 (Trademark)
Durez 220 (Trademark)
Phenol ether resin:

Methylon 75202 (Trademark)
[Polyamide]

Methylolpolyamide:

Nylon, type 8 (Trademark)
Dimer acid — polyamine condensation product:

Versamid 100 (Trademark)
Versamid 115 (Trademark)
Versamid 900 (Trademark)
Versamid 930 (Trademark)
Versamid 940 (Trademark)
Versamid 1112 (Trademark)

TABLE 2-continued

Versamid 1175 (Trademark)
[Polyester]

Linear polyester:

Vitel resin PE100-X (Trademark)
Polyethylene terephthalate:

Soluble Mylar 49000 (Trademark)
Soluble Mylar 49001 (Trademark)
Soluble Mylar 49002 (Trademark)
[Rosin derivatives]

WW rubber rosin (Trademark)
Wood rosin M grade (Trademark)
Ester rubber:

Alkydol 160 (Trademark)
Rosin-modified phenol resin

Amberol F-7 (Trademark)
Maleic rosin type:

Amberol 750 (Trademark)
Amberol 801 (Trademark)
Arochem 455 (Trademark)
Arochem 462 (Trademark)
Polymerized rosin:

Dymerex (Trademark)
Nelio B 952 (Trademark)
Nelio VB 757 (Trademark)
Rosin-modified alkyd resin:

Neolyn 23 (Trademark)
α-pinene resin:

Newport V-40 (Trademark)
Pentaerythritol ester of rosin:

Pentalyn A (Trademark)
Pentaerythritol ester of dimerized rosin

Pentalyn K (Trademark)
Rosin-based polymer:

Pentalyn 830 (Trademark)
Pentalyn 856 (Trademark)
[Others]

Chlorinated rubber
Chlorosulfonated polyethylene:

Hypalon 20 (Trademark)
Hypalon 30 (Trademark)
Shellac
Silicone polymer

Silicone DC-23 (Trademark)
Silicone DC-1107 (Trademark)
Partially hydrolyzed, methoxylated materials of phenyl and phenyl methyl silane:

Sylkyd 50 (Trademark)
Dammar (natural resin)
p-toluenesulfonamide — folmaldehyde resin:

Santolite MHP (Trademark)
Phosgene — bisphenol A polycarbonate condensation product:

Lexan 100, 105 (Trademark)
Polyoxyethyleneglycol:

Carbowax 4000 (Trademark)

Representative Resins with the SP value of the previously mentioned SP formula are shown in the following Table 3:

татле 3 polybutadiene (cis)
polychloroprene
polyethylene
polymethylene
polyisobutylene
polymethacrylonitrile
polystylene
teflon
polyvinyl acetate
polymethyl acrylate
polyethyl acrylate
neoprene
polybutyl acrylate
polyvinylidene chloride
polypropyleneoxide
polyethyl methacrylate
polybutyl methacrylate
polybutadien·acrylonitrile (75:25)
nylon
polyacrylonitrile As the image releasing means for use in the present invention, there can be employed thermoplastic adhesive agents made of vinyl acetate polymer and copolymer, acrylic copolymer, ethylenic copolymer, polyamide, polyester, polyurethane or the like: rubber adhesive agents made of polychloroprene, nitrile rubber, reclaimed rubber, SBR rubber, natural rubber or the lake; and pressure sensitive adhesive agents made of rubber, acrylic resin or the like.

In the case where synthetic resins having the previously mentioned SP values cannot their mechanical shape as an image releasing member, they can be used by providing them on a support such as a rubber roller, a sheet support or a tape support.

As such a tape member, for example, cellophane tape, adhesive craft-paper tape, polyvinyl chloride tape, acetate tape, and filament-reinforced tape can be employed.

In the present invention, support on which thermofusible ink images are formed is impregnated with water, a surfactant, and a water-soluble polymer, and an image releasing member comprising any of the previously mentioned resins is then brought into close contact with the thermo-fusible ink images on the support with the application of heat thereto, thereby causing the image releasing member to adhere to the thermofusible ink images which are in a fused state, and the thermofusible ink images are released from the support through the image releasing member.

A support which is prepared by impregnating a support material with an aqueous solution containing a surfactant, an aqueous solution containing a water-soluble polymer, or an aqueous solution containing a water-soluble polymer and a surfactant, and then drying the support material has a more effective image releasing performance as an image-bearing support for use in the present invention.

The features of this invention will become apparent in the course of the following description of exemplary embodiments, which are given for illustration of the invention and not intended to be limiting thereof.

EXAMPLE 1

A toner image bearing copy paper which was prepared by use of a commercially available plain paper copying machine (Trademark "IMAGIO 320 FPT" made by Ricoh Co., Ltd.).

The thus prepared toner image bearing copy paper was immersed into water and impregnated with water.

The toner image bearing side of the copy paper was heated, and a toner resin roller comprising a toner resin composed of polystyrene: poly-n-butyl acrylate: poly-i-butyl methacrylate (10:4:8) was brought into pressure contact with the heated toner image bearing side of the copy paper. The toner image was transferred in a fused state to the toner resin roller, and when the toner resin roller was removed from the copy paper, the toner image was transferred to the toner resin roller and completely released from the copy paper.

The copy paper which passed over the toner resin roller was a plain paper free from toner images thereon. This copy paper was dried, and toner images were formed once again on the copy paper by use of the above-mentioned copying machine. The result was that clear toner images were formed on the copy paper exactly in the same state as first formed.

The above operation was repeated 5 times. Toner images with the same quality were formed on the copy paper throughout the above five operations.

In the above, each operation took at least about 30 seconds. However, when the toner image bearing copy paper was immersed into water and impregnated with water with the copy paper being subjected to an ultrasonic wave treatment, it was possible to carry out the impregnation of water in 2 to 3 seconds, so that the impregnation time was significantly shortened and accordingly the releasing of the toner images was performed efficiently.

EXAMPLE 2

The same toner image releasing operation as in Example 1 was repeated five times except that water employed in Example 1 was replaced by a 1% aqueous solution of a commercially available surfactant (Trademark "Tonerclean" made by Nippon Nyukazai Co., Ltd.).

The quality of toner images formed on the copy paper after the toner image releasing operation was repeated five times was completely the same as that of toner images formed on a fresh copy paper.

In the above toner image releasing operations, when the toner image bearing copy paper was immersed into the aqueous solution of the surfactant and impregnated with the aqueous solution, with the copy paper being subjected to an ultrasonic wave treatment, the impregnation time was significantly shortened and accordingly the releasing of the toner images was performed efficiently.

EXAMPLE 3

The same toner image releasing operation as in Example 1 was repeated five times except that water employed in Example 1 was replaced by a 2% aqueous solution of starch.

The quality of toner images formed on the copy paper after the toner image releasing operation was repeated five times was completely the same as that of toner images formed on a fresh copy paper.

In the above toner image releasing operations, when the toner image bearing copy paper was immersed into the aqueous solution of starch and impregnated with the aqueous solution, with the copy paper being subjected to an ultrasonic wave treatment, the impregnation time was significantly shortened and accordingly the releasing of the toner images was performed efficiently.

EXAMPLE 4

The same toner image releasing operation as in Example 1 was repeated five times except that water employed in Example 1 was replaced by an aqueous solution of a commercially available Surfactant (Trademark "Tonerclean" made by Nippon Nyukazai Co., Ltd.) in an amount of 1.5% and starch, which is a water-soluble polymer, in an amount of 3 %.

The quality of toner images formed on the copy paper after the toner image releasing operation was repeated five times was completely the same as that of toner images formed on a fresh copy paper.

In the above toner image releasing operations, when the toner image bearing copy paper was immersed into the aqueous solution of the surfactant and starch and impregnated with the aqueous solution, with the copy paper being subjected to an ultrasonic wave treatment, the impregnation time was significantly shortened and accordingly the releasing of the toner images was performed efficiently.

EXAMPLE 5

A toner image bearing copy paper which was prepared by use of a commercially available plain paper copying machine (Trademark "IMAGIO 320 FPI" made by Ricoh Co., Ltd.).

The thus prepared toner image bearing copy paper was immersed into an aqueous solution of a commercially available surfactant (Trademark "Tonerclean" made by Nippon Nyukazai Co., Ltd.) in an amount of 1.5%, and carboxymethyl cellulose (CMC), which is a water-soluble polymer, in an amount of 3%. and impregnated with the solution.

The toner image bearing side of the copy paper was heated, and the same toner resin roller as employed in Example 1 was brought into pressure contact with the heated toner image bearing side of the copy paper. The toner image was transferred in a fused state to the toner resin roller, and when the toner resin roller was removed from the copy paper, the toner image was transferred to the toner resin roller and completely released from the copy paper.

The copy paper which passed over the toner resin roller was a plain paper free from toner images thereon. This copy paper was dried, and toner images were formed once again on the copy paper by use of the above-mentioned copying machine. The result was that clear toner images were formed on the copy paper exactly An the same state as first formed.

The above operation was repeated 5 times. Toner images with the same quality were formed on the copy paper throughout the above five operations.

In the above toner image releasing operations, when the toner image bearing copy paper was immersed into the aqueous solution of the surfactant and CMC and impregnated with the aqueous solution, with the copy paper being subjected to an ultrasonic wave treatment, the impregnation time was significantly shortened and accordingly the releasing of the toner images was performed efficiently.

EXAMPLE 6

A toner image bearing copy paper which was prepared by use of a commercially available plain paper copying machine (Trademark "IMAGIO 320 FPI" made by Ricoh Co., Ltd. ).

The thus prepared toner image bearing copy paper was immersed into an aqueous solution of a commercially available surfactant (Trademark "Tonerclean" made by Nippon Nyukazai Co., Ltd. ) in an amount of 1.5%, and carboxymethyl cellulose (CMC), which is a water-soluble polymer, in an amount of 3%. and impregnated with the solution.

The toner image bearing aide of the copy paper was heated, and an image releasing sheet made of a toner resin comprising polystyrene: poly-n-butyl acrylate; poly-i-butyl methacrylate (10:4:8) was brought into pressure contact with the heated toner image bearing side of the copy paper. The toner image was transferred in a fused state to the image releasing sheet, and when the image releasing sheet was removed from the copy paper, the toner image was transferred to the image releasing sheet and completely released from the copy paper.

The copy paper peeled away from the image releasing sheet was a plain paper free from toner images thereon. This copy paper was dried, and toner images were formed once again on the copy paper by use of the above-mentioned copying machine. The result was that clear toner images were formed on the copy paper exactly in the same state as first formed.

The above operation was repeated 5 times. Toner images with the same quality were formed on the copy paper throughout the above five operations.

In the above toner image releasing operations, when the toner image bearing copy paper was immersed into the aqueous solution of the surfactant and CMC and impregnated with the aqueous solution, with the copy paper being subjected to an ultrasonic wave treatment, the impregnation time was significantly shortened and accordingly the releasing of the toner images was performed efficiently.

What is claimed is:

1. A method for recycling a support material of an image-bearing support comprising the steps of:

impregnating an image-bearing support, at least part of which is composed of a paper layer, and on which paper layer images made from a hydrophobic thermofusible ink comprising a thermofusible resin component are formed, with at least one of water or an aqueous solution which is selected from the group consisting of an aqueous solution containing a surfactant, an aqueous solution containing a water-soluble polymer, and an aqueous solution containing a water-soluble polymer and a surfactant, thereby reducing the adhesion between the hydrophobic ink and the paper while substantially retaining the hydrophobic ink images on the paper support, causing an image release member to contact the image bearing side of said support with the application of heat thereto, said image release member comprising a resin layer which comprises the same thermofusible resin component as that contained in said thermofusible ink, or a resin layer having the same or substantially the same SP value as that of said thermofusible resin component in said thermofusible ink; and peeling said images away from said support, under the conditions that said thermofusible ink is fused and the images are adhered to the image release member, by removing said image release member from said support.

2. The method for recycling a support of an image-bearing support as claimed in claim 1, wherein said image release member comprises a resin layer comprising a resin component having an SP value represented by formula (I):

SP value=8.0 to 12.0 $(cal/cm^3)^{1/2}$.

3. The method for recycling a support of an image-bearing support as claimed in claim 1, wherein said image-bearing support is impregnated with at least one of water or said aqueous solution selected from the group consisting of an aqueous solution containing a surfactant, an aqueous solution containing a water-soluble polymer, and an aqueous solution containing a water-soluble polymer and a surfactant, with said image-bearing support being subjected to an ultrasonic wave treatment.

4. The method for recycling a support of an image-bearing support as claimed in claim 1, wherein the support material of said image-bearing support is prepared by the steps of:

impregnating a support material with at least one of water or said aqueous solution selected from the group consisting of an aqueous solution containing a surfactant, an aqueous solution containing a water-soluble polymer, and an aqueous solution containing a water-soluble polymer and a surfactant, and drying said support material impregnated with at least one of water or said aqueous solution.

* * * * *

UNITED STATES PATENT AND TRADEMARK OFFICE
CERTIFICATE OF CORRECTION

PATENT NO. : 5,635,005
DATED : JUNE 3, 1997
INVENTOR(S) : TADASHI SAITOCH ET AL

It is certified that error appears in the above-identified patent and that said Letters Patent is hereby corrected as shown below:

Column 7, line 25, "en" should read --an--.

Column 10, line 28, "lake" should read --like--;
       line 31, "cannot their" should read --cannot keep their--.

Column 12, line 29, "3%." should read --3%--;
       line 43, "An" should read --in--;
       line 65, "3%." should read --3%--;
       line 66, "aide" should read --side--.

Signed and Sealed this

Fourteenth Day of July, 1998

*Attest:*

BRUCE LEHMAN

*Attesting Officer*     *Commissioner of Patents and Trademarks*